(12) United States Patent
Jia

(10) Patent No.: US 9,467,914 B2
(45) Date of Patent: Oct. 11, 2016

(54) INCOMING CALL PROCESSING METHOD FOR DUAL MODE TERMINAL AND DUAL MODE TERMINAL THEREOF

(75) Inventor: Xin Jia, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 274 days.

(21) Appl. No.: 14/119,954

(22) PCT Filed: Jan. 16, 2012

(86) PCT No.: PCT/CN2012/070399
§ 371 (c)(1),
(2), (4) Date: Nov. 25, 2013

(87) PCT Pub. No.: WO2013/071706
PCT Pub. Date: May 23, 2013

(65) Prior Publication Data
US 2014/0295841 A1    Oct. 2, 2014

(30) Foreign Application Priority Data
Nov. 17, 2011    (CN) .......................... 2011 1 0363950

(51) Int. Cl.
*H04W 24/00*    (2009.01)
*H04W 36/14*    (2009.01)
(Continued)

(52) U.S. Cl.
CPC .............. *H04W 36/14* (2013.01); *H04W 4/16* (2013.01); *H04W 8/18* (2013.01); *H04W 48/18* (2013.01); *H04W 88/06* (2013.01)

(58) Field of Classification Search
CPC ..... H04W 36/14; H04W 48/18; H04W 4/16; H04W 88/06; H04W 8/18
See application file for complete search history.

(56) References Cited

U.S. PATENT DOCUMENTS

| 2011/0012987 A1 | 1/2011 | Yoon |
| 2011/0117909 A1 | 5/2011 | Cao et al. |

(Continued)

FOREIGN PATENT DOCUMENTS

| CN | 101150842 A | 3/2008 |
| CN | 101980569 A | 2/2011 |

(Continued)

OTHER PUBLICATIONS

International Search Report for PCT/CN2012/070399 dated Aug. 2, 2012.

*Primary Examiner* — Thai Vu
(74) *Attorney, Agent, or Firm* — Ling Wu; Stephen Yang; Ling and Yang Intellectual Property

(57) ABSTRACT

The present document provides an incoming call processing method for a dual mode terminal and the dual mode terminal which has a first mode card and a second mode card, and the incoming call processing method for the dual mode terminal includes the following steps: the first mode card of the dual mode terminal receiving an incoming call signal; if the dual mode terminal determines that the incoming call signal meets the switch condition, then automatically switching the incoming call signal to the second mode card. With the above-mentioned incoming call processing method for the dual mode terminal and the dual mode terminal, it is to switch the incoming call intelligently based on the mobile phone number heterogeneous network and/or the network signal quality to facilitate the user to answer the incoming call, thus enabling the user to answer the incoming call with lower telephone expense or better signal quality.

6 Claims, 2 Drawing Sheets

(51) Int. Cl.
*H04W 4/16* (2009.01)
*H04W 88/06* (2009.01)
*H04W 8/18* (2009.01)
*H04W 48/18* (2009.01)

(56) References Cited

U.S. PATENT DOCUMENTS

2011/0223866 A1  9/2011  Cho
2011/0269503 A1* 11/2011  Park .................... H04W 8/183
                                                        455/552.1
2012/0115545 A1* 5/2012  Middleton ........ H04M 1/72563
                                                        455/558
2012/0302290 A1* 11/2012  Tsai ...................... H04W 8/183
                                                        455/558

FOREIGN PATENT DOCUMENTS

CN      102149155 A      8/2011
WO      2010140781 A2   12/2010

* cited by examiner

INCOMING CALL PROCESSING METHOD FOR DUAL MODE TERMINAL AND DUAL MODE TERMINAL THEREOF

TECHNICAL FIELD

The present document relates to the communication field, and in particular, to an incoming call processing method for a dual mode terminal and the dual mode terminal.

BACKGROUND OF THE RELATED ART

The dual mode mobile phone supports two kinds of networks simultaneously, and there are the following situations when the user answers the incoming call, the dual mode mobile phone of the Code-Division Multiple Access (CDMA) system and the Global System of Mobile Communications) GSM) system is taken as an example:

in a first situation: when there is a GSM incoming call on a CDMA card, or a CDMA incoming call on a GSM card, the user hopes to select a homogeneous network to answer because the conversation expense between the homogeneous networks is generally lower than the expense between heterogeneous networks;

in a second situation: there is an incoming call on the CDMA card, but the CDMA network signal of the current environment is relatively poor; or there is an incoming call on the GSM card, but the GSM network signal of the current environment is relatively poor, then the user hopes to select the network with a better network signal to answer.

SUMMARY OF THE INVENTION

The switching of the incoming call answering on the dual mode mobile phones of all the manufacturers in the existing scheme needs the user to judge the network signal quality of the current located environment or the home network of the calling number by oneself; when it is determined that the network signal quality of the current environmental is bad or the calling number and the called number are not for the same operator network, if performing the switching, the user can only hang up the incoming call of the current network manually and then reinitiates the calling from another mode network, which brings the inconvenience to the user.

The embodiment of the present document provides an incoming call processing method for a dual mode terminal and the dual mode terminal, to solve the current problem that switching the incoming call manually brings the inconvenience to the user.

The embodiment of the present document provides an incoming call processing method for a dual mode terminal, wherein, the dual mode terminal is provided with a first mode card and a second mode card, and the method comprises:

the first mode card of the dual mode terminal receiving an incoming call signal; and the dual mode terminal determining that the incoming call signal meets a switch condition, then switching the incoming call signal to the second mode card automatically.

Preferably, when the switch condition is a heterogeneous network switch condition, the dual mode terminal determining that the incoming call signal meets the switch condition, and then switching the incoming call signal to the second mode card automatically, comprises:

the dual mode terminal comparing an obtained home network of a calling number with a home network of a called number; if those two are inconsistent, then switching the incoming call signal to the second mode card automatically.

Preferably, when the switch condition is a network signal quality switch condition, the dual mode terminal determining that the incoming call signal meets the switch condition, and then switching the incoming call signal to the second mode card automatically, comprises:

the dual mode terminal determining that a current network environment signal quality of the first mode card is lower than a preset first threshold value and a current network environment signal quality of the second mode card is higher than a preset second threshold value, and then switching the incoming call signal to the second mode card automatically.

Preferably, when the switch condition comprises the heterogeneous network switch condition and the network signal quality switch condition, the dual mode terminal determining that the incoming call signal meets the switch condition, and then switching the incoming call signal to the second mode card automatically, comprises:

when a priority of the heterogeneous network switch condition is higher than a priority of the network signal quality switch condition, the dual mode terminal inquiring a mobile number home network list stored locally, obtaining the home network of the calling number, and comparing the home network of the calling number with the home network of the called number; if those two are inconsistent, then switching the incoming call signal to the second mode card automatically; and when the priority of the network signal quality switch condition is higher than the priority of the heterogeneous network switch condition, the dual mode terminal determining that the current network environment signal quality of the first mode card is lower than the preset first threshold value and the current network environment signal quality of the second mode card is higher than the preset second threshold value, and switching the incoming call signal to the second mode card dual mode terminal automatically; the dual mode terminal determining that the current network environment signal quality of the first mode card is higher than the preset first threshold value and the current network environment signal quality of the second mode card is higher than the preset second threshold value, and then comparing the obtained home network of the calling number with the home network of the called number; if those two are inconsistent, then switching the incoming call signal to the second mode card automatically.

Preferably, before the dual mode terminal compares the obtained home network of the calling number with the home network of the called number, the method further comprises:

the dual mode terminal inquiring the mobile number home network list stored locally, and obtaining the home network of the calling number.

Preferably, before the dual mode terminal determines that the incoming call signal meets the switch condition, and then switches the incoming call signal to the second mode card automatically, the method further comprises:

the dual mode terminal opening an intelligence answering function.

The embodiment of the present document further provides a dual mode terminal, which has a first mode card and a second mode card, and comprising:

a conversation module, configured to: receive an incoming call signal by using the first mode card; and a switching module, configured to: determine that the incoming call signal meets a switch condition, and then switch the incoming call signal to the second mode card automatically.

Preferably, the switching module is configured to: when the switch condition is a heterogeneous network switch condition, compare an obtained home network of a calling number with a home network of a called number; if those two are inconsistent, then switch the incoming call signal to the second mode card automatically; or the switching module is configured to: when the switch condition is a network signal quality switch condition, determine that a current network environment signal quality of the first mode card is lower than a preset first threshold value and a current network environment signal quality of the second mode card is higher than a preset second threshold value, and then switch the incoming call signal to the second mode card automatically; or the switching module is configured to: when the switch condition comprises the heterogeneous network switch condition and the network signal quality switch condition, when a priority of the heterogeneous network switch condition is higher than a priority of the network signal quality switch condition, inquire a mobile number home network list stored locally, obtain the home network of the calling number, and compare the home network of the calling number with the home network of the called number; if those two are inconsistent, then switch the incoming call signal to the second mode card automatically;

when the priority of the network signal quality switch condition is higher than the priority of the heterogeneous network switch condition, determine that the current network environment signal quality of the first mode card is lower than the preset first threshold value and the current network environment signal quality of the second mode card is higher than the preset second threshold value, and switch the incoming call signal to the second mode card automatically; determine that the current network environment signal quality of the first mode card is higher than the preset first threshold value and the current network environment signal quality of the second mode card is higher than the preset second threshold value, and then compare the obtained home network of the calling number with the home network of the called number; if those two are inconsistent, then switch the incoming call signal to the second mode card automatically.

Preferably, the dual mode terminal further comprises:

a storage module, configured to: store a mobile number home network list of a corresponding relationship of a mobile number and a home network thereof.

Preferably, the switching module is configured to: before comparing the obtained home network of the calling number with the home network of the called number, inquire the mobile number home network list stored by the storage module, and obtain the home network of the calling number.

With the above-mentioned incoming call processing method for the dual mode terminal and the dual mode terminal, it is to switch the incoming call intelligently based on the mobile phone number heterogeneous network and/or the network signal quality, facilitate the user to answer the incoming call, and enable the user to answer the incoming call with lower telephone expense and better signal quality.

PREFERRED EMBODIMENTS OF THE INVENTION

In order to make the objective, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

Figure 1:
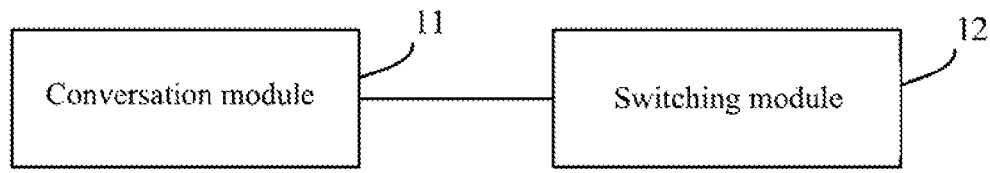
FIG. 1 is a structure diagram of a dual mode terminal according to an embodiment of the present document.

FIG. 1 is a structure diagram of the dual mode terminal of the present document; the dual mode terminal is provided with a first mode card and a second mode card, and includes a conversation module 11 and a switching module 12, wherein, the conversation module is configured to: receive an incoming call signal by using the first mode card; and the switching module is configured to: if determining that the incoming call signal meets a switch condition, then switch the incoming call signal to the second mode card automatically.

The above-mentioned conversation module belongs to the related art, and will not be described in detail here; the above-mentioned switching module is used to complete the incoming call switching between different mode cards of the dual mode and dual standby terminal, and switch the incoming call of the first mode card to the second mode card; and the specific implementation can be realized on the network side and also can be realized on the terminal side. The implementation process on the terminal side is: to activate the busy call switching of two mode cards in advance, and the switching number is the number of another mode card. When there is an incoming call signal for the first mode card, and if the switching module is started, the switching module feeds back signaling message that the first mode card of the terminal is busy (UserBusy) to the network side through the conversation module, and switch the incoming call signal of the first mode card to the second mode card. The second mode card displays a menu for answering or rejecting on the incoming call display interface for the user to select after receiving the incoming call signal; if selecting to answer, connection message is returned to the network side; if selecting to reject, call rejected message is returned to the network side.

The above-mentioned dual mode terminal can be a CDMA/GSM dual mode terminal, also can be the Wideband Code Division Multiple Access (WCDMA)/GSM dual mode terminal, and also can be the Time Division-Synchronous Code Division Multiple Access (TDSCDMA)/GSM dual mode terminal, etc.

Figure 2:
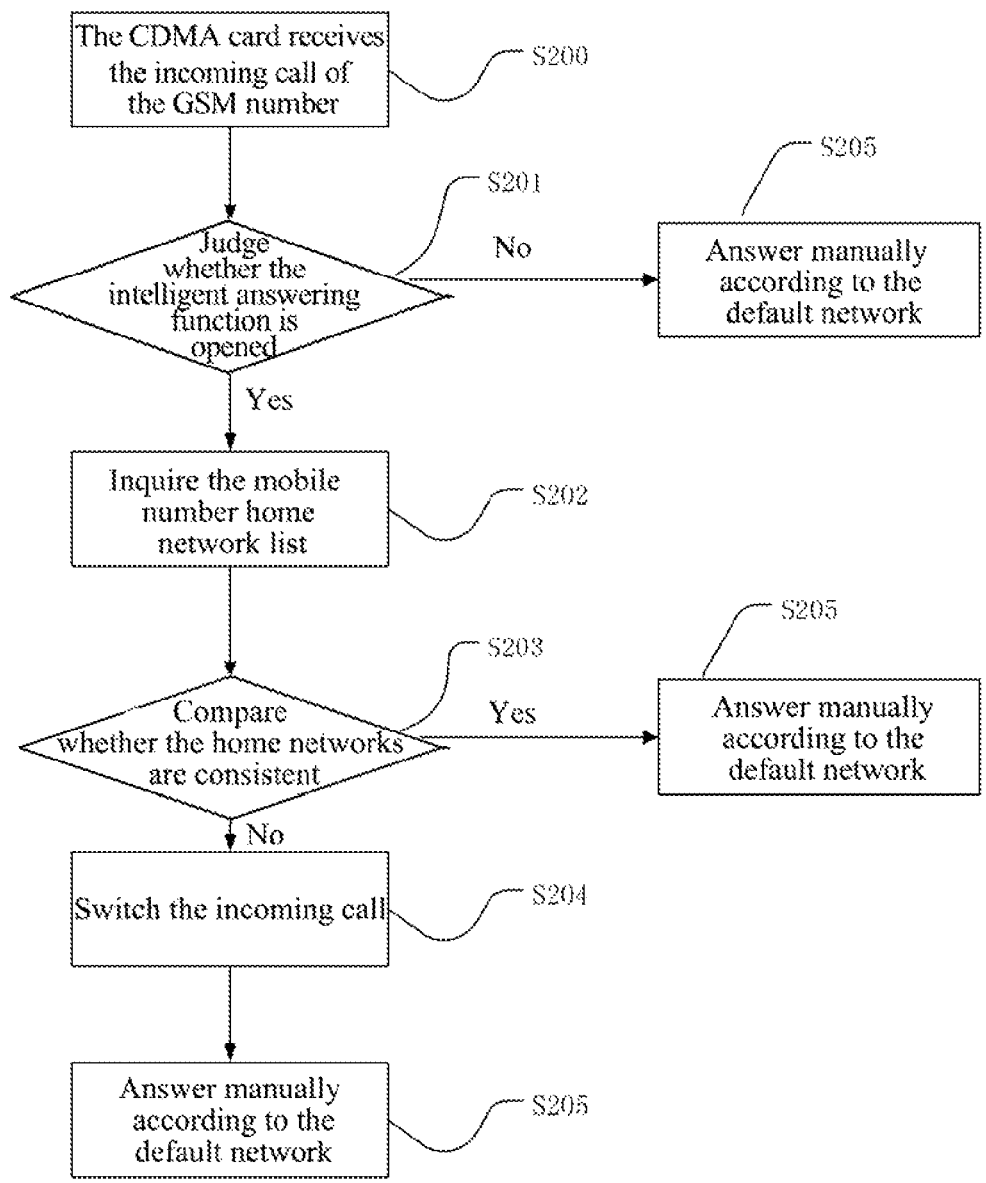
FIG. 2 is a flow chart of an incoming call processing method for a dual mode terminal according to embodiment one of the present document.

FIG. 2 shows a flow chart of an incoming call processing method for a dual mode terminal according to embodiment one of the present document; the embodiment explains an intelligent processing procedure of the incoming call of the dual mode terminal of the present document by taking the CDMA/GSM dual mode terminal as an example, and the procedure includes the following steps:

in step S200, the first mode card of the dual mode terminal receives the incoming call signal;

the step can be that: the CDMA card of the CDMA/GSM dual mode terminal receives the incoming call of the GSM number, for example, the incoming call number is a China Mobile number 136 ********;

in step S201, the CDMA/GSM dual mode terminal judges whether the intelligent answering function is opened; if opened, then the step S202 is executed; otherwise, the step S205 is executed, to answer manually according to the default network;

the step is an optional step, that is, the intelligent answering function is opened by the dual mode terminal all the time by default;

in step S202, the dual mode terminal inquires a mobile number home network list stored locally, and obtains a home network of a calling number;

the CDMA/GSM dual mode terminal inquires the mobile number home network list of the corresponding relationship of the mobile number and the home network stored and preset locally, and determines that the home network of the number is the GSM network;

in step S203, the dual mode terminal compares the obtained home network of the calling number with the home network of the called number; if those two are inconsistent, then the step S204 is executed; otherwise, the step S205 is executed, to answer manually;

the CDMA/GSM dual mode terminal compares the home network of the calling number with the home network of the current called card; if the home network of the calling number is GSM and the home network of the called card is CDMA, it is determined that the home networks are inconsistent and the step S204 is executed; otherwise, it is to answer manually according to the default network;

in step S204, the incoming call signal is switched to the second mode card automatically;

the CDMA/GSM dual mode terminal switches the GSM incoming call from the CDMA card to the other GSM card through the switching module;

in step S205, the CDMA card answers manually according to the default network after receiving the incoming call.

The first mode card in the embodiment can be the CDMA card, and the second mode card is the GSM card; certainly, also, the first mode card can be the GSM card, and the second mode card is the CDMA card.

The above-mentioned incoming call processing method for the dual mode terminal enables the user to answer the incoming call with lower telephone expense, and facilitates the user to answer the incoming call.

Figure 3:
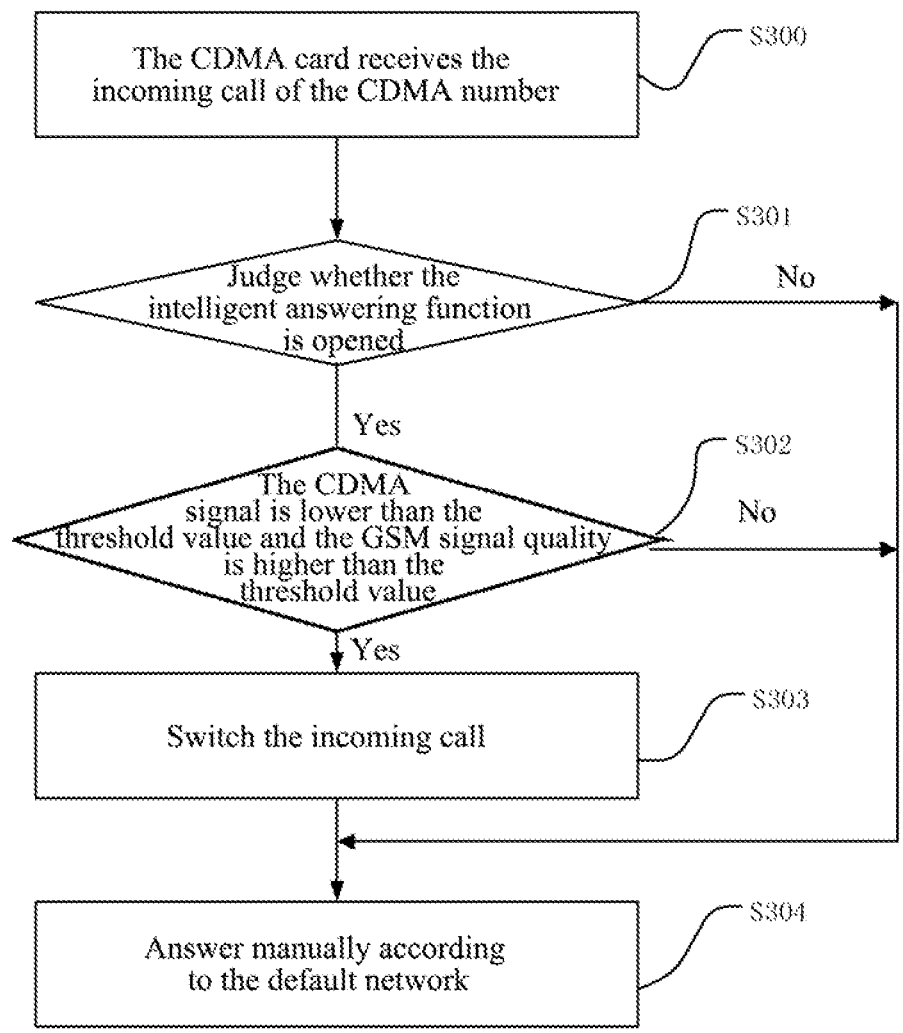
FIG. 3 is a flow chart of an incoming call processing method for a dual mode terminal according to embodiment two of the present document.

FIG. 3 shows a flow chart of an incoming call processing method for a dual mode terminal according to embodiment two of the present document; the embodiment explains an intelligent processing procedure of the incoming call of the dual mode terminal of the present document by taking the CDMA/GSM dual mode terminal as an example, and the procedure includes the following steps:

in step S300, the first mode card of the dual mode terminal receives the incoming call signal;

the step can be that: the CDMA card of the CDMA/GSM dual mode terminal receives the incoming call of the CDMA number, for example, the incoming call number is a China Telecom number 189 ********;

in step S301, the CDMA/GSM dual mode terminal judges whether the intelligent answering function is opened; if opened, then the step S302 is executed; otherwise, the step S304 is executed, to answer manually according to the default network;

in step S302, if the dual mode terminal determines that the current network environment signal quality of the first mode card is lower than a preset first threshold value, and the current network environment signal quality of the second mode card is higher than a preset second threshold value, then the step S303 is executed, otherwise, the step S304 is executed to answer manually;

the CDMA/GSM dual mode terminal judges whether the signal quality of the current network environment of the CDMA card of the answered call is lower than the first threshold value set by the terminal, and the signal quality of the current network environment of the GSM is higher than the second threshold value, if yes, then the step S303 is executed; otherwise it is to answer manually according to the default network;

the above-mentioned first threshold value and the second threshold value can be set dynamically as required, and can the same and also can be different;

the above-mentioned signal quality can be determined according to the receiving signal code power (RSCP) value of the current network.

In step S303, the incoming call signal is switched to the second mode card automatically;

the CDMA/GSM dual mode terminal switches the CDMA incoming call from the CDMA card to the other GSM card through the switching module;

in step S304, the GSM card answers manually according to the default network after receiving the incoming call.

The above-mentioned incoming call processing method for the dual mode terminal enables the user to answer the incoming call with better signal quality, and facilitates the user to answer the incoming call.

In the above-mentioned embodiment, the intelligent switching is performed based on the mobile phone number heterogeneous network and the intelligent switching is performed based on the signal quality of the network respectively; if the intelligent switching is based on multiple switch conditions at the same time, then it further needs to determine the priority of the multiple switch conditions, and it is judged and processed successively according to the priority from high to low; for example, the intelligent switching is performed based on the heterogeneous network switch condition and the network signal quality switch condition at the same time; when the priority of the heterogeneous network switch condition is higher than the priority of the network signal quality switch condition, the dual mode terminal inquires the mobile number home network list stored locally, obtains the home network of the calling number, and compares the home network of the calling number with the home network of the called number; if those two are inconsistent, then switches the incoming call signal to the second mode card automatically. When the priority of the network signal quality switch condition is higher than the priority of the heterogeneous network switch condition, if the dual mode terminal determines that the current network environment signal quality of the first mode card is lower than the preset first threshold value and the current network environment signal quality of the second mode card is higher than the preset second threshold value, it switches the incoming call signal to the second mode card automatically; if the dual mode terminal determines that the current network environment signal quality of the first mode card is higher than the preset first threshold value and the current network environment signal quality of the second mode card is higher than the preset second threshold value, then it compares the obtained home network of the calling number with the home network of the called number; if those two are inconsistent, then switches the incoming call signal to the second mode card automatically.

In all, the above-mentioned way can facilitate the user to answer the incoming call.

It can be understood by those skilled in the art that all or part of steps in the above-mentioned method can be fulfilled by programs instructing the relevant hardware components, and the above-mentioned programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, which should be embodied in the scope of the appending claims of the present document.

INDUSTRIAL APPLICABILITY

With the above-mentioned incoming call processing method for the dual mode terminal and the dual mode terminal, it is to switch the incoming call intelligently based on the mobile phone number heterogeneous network and/or the network signal quality, facilitate the user to answer the incoming call, and enable the user to answer the incoming call with lower telephone expense and better signal quality.

I claim:

1. An incoming call processing method for a dual mode terminal which has a first mode card and a second mode card, comprising:
   the first mode card of the dual mode terminal receiving an incoming call signal; and
   if the dual mode terminal determines that the incoming call signal meets a switch condition, switching the incoming call signal to the second mode card automatically;
   wherein, when the switch condition comprises a heterogeneous network switch condition and a network signal quality switch condition, the step of if the dual mode terminal determines that the incoming call signal meets the switch condition, switching the incoming call signal to the second mode card automatically, comprises:
   when a priority of the heterogeneous network switch condition is higher than a priority of the network signal quality switch condition,
      the dual mode terminal inquiring a mobile number home network list stored locally, obtaining a home network of a calling number;
      comparing the home network of the calling number with a home network of a called number; and
      if those two are inconsistent, switching the incoming call signal to the second mode card automatically; and
   when the priority of the network signal quality switch condition is higher than the priority of the heterogeneous network switch condition,
      if the dual mode terminal determines that a current network environment signal quality of the first mode card is lower than a preset first threshold value and a current network environment signal quality of the second mode card is higher than a preset second threshold value, switching the incoming call signal to the second mode card automatically;
      if the dual mode terminal determines that the current network environment signal quality of the first mode card is higher than the preset first threshold value and the current network environment signal quality of the second mode card is higher than the preset second threshold value, comparing the obtained home network of the calling number with the home network of the called number; if those two are inconsistent, switching the incoming call signal to the second mode card automatically.

2. The method according to claim 1, wherein,
   before the dual mode terminal compares the obtained home network of the calling number with the home network of the called number, the method further comprises:
   the dual mode terminal inquiring the mobile number home network list stored locally, and obtaining the home network of the calling number.

3. The method according to claim 1, wherein,
   before the dual mode terminal determines that the incoming call signal meets the switch condition, and then switches the incoming call signal to the second mode card automatically, the method further comprises:
   the dual mode terminal opening an intelligence answering function.

4. A dual mode terminal, which has a first mode card and a second mode card, comprising hardware performing instructions stored in a non-transitory computer readable medium which executes steps in following modules:
   a conversation module, configured to: receive an incoming call signal by using the first mode card; and
   a switching module, configured to: if determining that the incoming call signal meets a switch condition, switch the incoming call signal to the second mode card automatically;
   wherein, the switching module is configured to:
   when the switch condition comprises a heterogeneous network switch condition and a network signal quality switch condition,
   when a priority of the heterogeneous network switch condition is higher than a priority of the network signal quality switch condition, inquire a mobile number home network list stored locally, obtain a home network of a calling number, and compare the home network of the calling number with a home network of a called number; if those two are inconsistent, switch the incoming call signal to the second mode card automatically;
   when the priority of the network signal quality switch condition is higher than the priority of the heterogeneous network switch condition, if determining that a current network environment signal quality of the first mode card is lower than a preset first threshold value and a current network environment signal quality of the second mode card is higher than a preset second threshold value, switch the incoming call signal to the second mode card automatically; if determining that the current network environment signal quality of the first mode card is higher than the preset first threshold value and the current network environment signal quality of the second mode card is higher than the preset second threshold value, compare the obtained home network of the calling number with the home network of the called number; if those two are inconsistent, switch the incoming call signal to the second mode card automatically.

5. The dual mode terminal according to claim 4, further comprising:
a storage module, configured to: store a mobile number home network list of a corresponding relationship of a mobile number and a home network thereof.

6. The dual mode terminal according to claim 5, wherein, the switching module is configured to: before comparing the obtained home network of the calling number with the home network of the called number, inquire the mobile number home network list stored by the storage module, and obtain the home network of the calling number.

\* \* \* \* \*